(12) United States Patent
Kim et al.

(10) Patent No.: US 10,347,120 B2
(45) Date of Patent: Jul. 9, 2019

(54) DISPLAY DEVICE, AND INTEGRATED REMOTE CONTROLLER SETTING METHOD AND SYSTEM FOR SAME

(71) Applicant: SAMSUNG ELECTRONICS CO., LTD., Suwon-si (KR)

(72) Inventors: Byuk-sun Kim, Seoul (KR); Kwan-young Kim, Suwon-si (KR); Kyu-jung Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/761,185

(22) PCT Filed: Oct. 19, 2016

(86) PCT No.: PCT/KR2016/011726
§ 371 (c)(1),
(2) Date: Mar. 19, 2018

(87) PCT Pub. No.: WO2017/069502
PCT Pub. Date: Apr. 27, 2017

(65) Prior Publication Data
US 2018/0268685 A1    Sep. 20, 2018

(30) Foreign Application Priority Data

Oct. 19, 2015    (KR) .......................... 10-2015-0145376

(51) Int. Cl.
*G06F 3/033*    (2013.01)
*G08C 19/28*    (2006.01)
(Continued)

(52) U.S. Cl.
CPC ......... *G08C 19/28* (2013.01); *G06F 3/04842* (2013.01); *G08C 23/04* (2013.01);
(Continued)

(58) Field of Classification Search
None
See application file for complete search history.

(56) References Cited

U.S. PATENT DOCUMENTS 5,752,184 A * 5/1998 Ishimura ................ G08C 15/06
340/12.22
7,429,932 B1    9/2008 Newell et al.
(Continued)

FOREIGN PATENT DOCUMENTS

EP    2892039 A1    7/2015
JP    11155177 A    6/1999
(Continued)

OTHER PUBLICATIONS

International Search Report (PCT/ISA/210), dated Jan. 20, 2017 by International Searching Authority in International Application No. PCT/KR2016/011726.
(Continued)

*Primary Examiner* — K. Wong
(74) *Attorney, Agent, or Firm* — Sughrue Mion, PLLC

(57) ABSTRACT

Disclosed is a display device. The display device comprises: a storage unit for storing control code sets corresponding to each of a plurality of remote controllers; a communication unit for receiving a first remote controller signal from a remote controller capable of controlling an external device; and a processor implementing controlling for automatically detecting a control code set corresponding to the remote controller from among the stored control code sets, on the basis of the received first remote controller signal, and transmitting the detected control code set to an integrated remote controller.

15 Claims, 16 Drawing Sheets

(51) Int. Cl.
*G08C 23/04* (2006.01)
*G06F 3/0484* (2013.01)
*G08C 17/02* (2006.01)

(52) U.S. Cl.
CPC ......... *G08C 17/02* (2013.01); *G08C 2201/21* (2013.01); *G08C 2201/30* (2013.01); *G08C 2201/92* (2013.01)

(56) References Cited

U.S. PATENT DOCUMENTS

| | | | |
|---|---|---|---|
| 8,542,320 B2* | 9/2013 | Berestov | H04N 21/4104 345/156 |
| 8,856,411 B2 | 10/2014 | Kim et al. | |
| 9,239,837 B2* | 1/2016 | Chardon | G06F 17/30011 |
| 9,432,608 B2* | 8/2016 | Kim | G08C 17/02 |
| 9,513,612 B2 | 12/2016 | Park | |
| 2010/0245113 A1 | 9/2010 | Schmehl et al. | |
| 2011/0102158 A1 | 5/2011 | Haughawout et al. | |
| 2011/0170787 A1 | 7/2011 | Gum | |
| 2014/0266639 A1 | 9/2014 | Zises | |
| 2015/0067080 A1 | 3/2015 | Cho et al. | |
| 2015/0179061 A1 | 6/2015 | Kim et al. | |

FOREIGN PATENT DOCUMENTS

| | | |
|---|---|---|
| JP | 2002078041 A | 3/2002 |
| JP | 2007214867 A | 8/2007 |
| JP | 2013517568 A | 5/2013 |
| KR | 1020020000396 A | 1/2002 |
| KR | 1020030013548 A | 2/2003 |
| KR | 1020060084884 A | 7/2006 |
| KR | 1020070031639 A | 3/2007 |
| KR | 100828931 B1 | 5/2008 |
| KR | 1020120079208 A | 7/2012 |
| KR | 1020120099857 A | 9/2012 |
| KR | 1020150028008 A | 3/2015 |
| KR | 1020150071944 A | 6/2015 |
| WO | 00/59212 A2 | 10/2000 |

OTHER PUBLICATIONS

Written Opinion (PCT/ISA/237), issued by the International Bureau in corresponding International Application No. PCT/KR2016/011726, dated Jan. 20, 2017.

Communication dated Jun. 25, 2018, issued by the European Patent Office in counterpart European Application No. 16857760.9.

* cited by examiner

| ☐ Do you want to use your "Comcast" with | Yes | Never show again |

Find TV Remote
(You can find
your comcast remote)

DISPLAY DEVICE, AND INTEGRATED REMOTE CONTROLLER SETTING METHOD AND SYSTEM FOR SAME

TECHNICAL FIELD

The present invention relates to a display device and a method for setting a remote controller thereof, and more particularly, to a display device which can set a control code set capable of controlling an external device in an integrated remote controller, and a method for setting an integrated remote controller thereof.

DESCRIPTION OF RELATED ART

The advancement of electronic technology has allowed the development of measures to connect a display device with various external devices, such as a set-top box (STB), DVD, audio, and the like. It is common to use a remote controller provided to each external device in order to control the external device. However, as the number of external devices increases, the number of remote controllers increases as well.

Accordingly, an integrated remote controller which can control all external devices with a single remote controller was developed. However, in order for an integrated remote controller to control an external device, a process of setting a control code set of the external device is required. Accordingly, the user needs to set a control code set of an external device desired to use. In the related art, as illustrated in FIG. 1, a method of capturing and storing a waveform of a remote control signal by bringing an integrated remote controller in touch with an external device was used. Alternatively, the user had to input a manufacturer or model information of a remote controller to control an external device.

However, it was not convenient for the user to directly perform an operation of setting a control code set of an external device.

Accordingly, measures for inducing the user to use an integrated remote controller by automatically setting the integrated remote controller are demanded.

DETAILED DESCRIPTION

Technical Problem

The present invention is to meet the above-mentioned demands, and the present invention is to provide a display device which facilitates setting of an integrated speaker by transmitting a control code set corresponding to a remote controller of an external device to the integrated remote controller, and a method for setting the integrated remote controller thereof.

Solution to Problem

A display device which is controllable by an integrated remote controller according to an example embodiment of the present invention to achieve the goal as above includes a storage unit configured to store a control code set corresponding to each of a plurality of remote controllers, a communication unit configured to receive a first remote control signal of a remote controller capable of controlling an external device, and a processor configured to, based on the received first remote control signal, automatically detect a control code set corresponding to the remote controller from among the stored control code set, and to control to transmit the detected control code set to the integrated remote controller.

Here, the processor may, in response to a same code as a code of the received first remote control signal being detected from among a plurality of codes included in the control code set, transmit a control code set including the detected code to the integrated remote controller and control to set a control code set capable of controlling the external device in the integrated remote controller.

The processor may, in response to a plurality of code sets including a same code as a code of the received first remote control signal, detect a control code set corresponding to the remote controller from among the stored control code sets based on a second remote control signal of the remote controller The display device further includes a display, wherein the processor may,
in response to the detected control code set being transmitted to the integrated remote controller, provide a GUI indicating that the external device is controllable by the integrated remote controller, through the display.

The processor may determine a location of the integrated remote controller, and provide a UI indicating location information of the integrated remote controller through the display.

The processor may transmit a control command to control the integrated remote controller to provide at least one from among light feedback, haptic feedback and sound feedback.

The processor may receive a control code set corresponding to each of the plurality of remote controllers from an external server and store the received control code set in the storage unit.

The first and second remote control signals may be any one of an IR signal, a BT signal, a BLE signal and a Zigbee signal.

According to an example embodiment, there is provided a system which includes an integrated remote controller and a display device controllable by the integrated remote controller, comprising: a display device configured to store a control code set corresponding to each of a plurality of remote controllers, in response to a first remote control signal of a remote controller capable of controlling an external device being received, to automatically detect a control code set corresponding to the remote controller from among the stored control code sets based on the received first remote control signal, and to transmit the detected control code set to the integrated remote controller; and an integrated remote controller configured to store a control code set for controlling the external device received from the display device and to assign the stored control code set to a remote controller key that is included in the integrated remote controller.

According to an example embodiment, there is provided a method for setting an integrated remote controller of a display device, the method comprising: receiving a first remote control signal of a remote controller capable of controlling an external device; detecting a control code set corresponding to the remote controller from among a control code set corresponding to each of a plurality of pre-stored remote controllers; and transmitting the detected control code set to the integrated remote controller.

The detecting may include, in response to a same code as a code of the received first remote control signal being detected from among a plurality of codes included in the control code set, detecting a control code set including the detected code as a control code set corresponding to the remote controller, and wherein the transmitting comprises transmitting the detected control code set to the integrated remote controller and setting a control code set capable of controlling the external device in the integrated remote controller.

The detecting may include, in response to a plurality of control code sets including a same code as a code of the received first remote control signal, detecting a control code set corresponding to the remote controller from among the stored control code sets based on a second remote control signal of the remote controller.

The setting method may further include: in response to the detected control code set being transmitted to the integrated remote controller, displaying a GUI indicating that the external device is controllable by the integrated remote controller.

The setting method may further include determining a location of the integrated remote controller and displaying a UI indicating location information of the integrated remote controller.

The setting method may further include transmitting, to the integrated remote controller, a control command to control the integrated remote controller to provide at least one from among light feedback, haptic feedback and sound feedback.

The setting method may further including receiving a control code set corresponding to each of the plurality of remote controllers and storing the control code set.

The first and second remote signals may be any one of an IR signal, a BT signal, a BLE signal and a Zigbee signal.

Effect of the Invention

As described above, according to the various example embodiments of the present invention, a control code set corresponding to a remote controller of an external device is automatically transmitted to an integrated remote controller and setting of the integrated remote controller is automatically performed, thus enhancing the user convenience and inducing the user to use the integrated remote controller.

BRIEF DESCRIPTION OF DRAWINGS

FIG. 10 is a diagram illustrating a GUI indicating that an external device is controllable, provided on a display, according to an example embodiment.

PREFERRED EMBODIMENTS FOR CARRYING OUT THE INVENTION

Embodiments for Carrying Out the Invention

Various example embodiments of the present disclosure will be described in greater detail below, with reference to the accompanying drawings.

Figure 1:
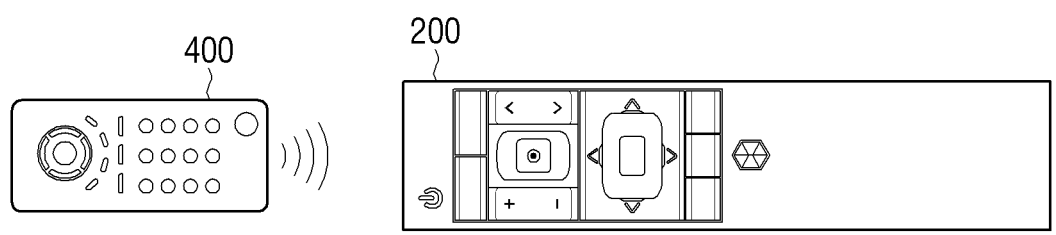
FIG. 1 is a diagram illustrating a method for setting a related-art integrated remote controller.
Figure 2:
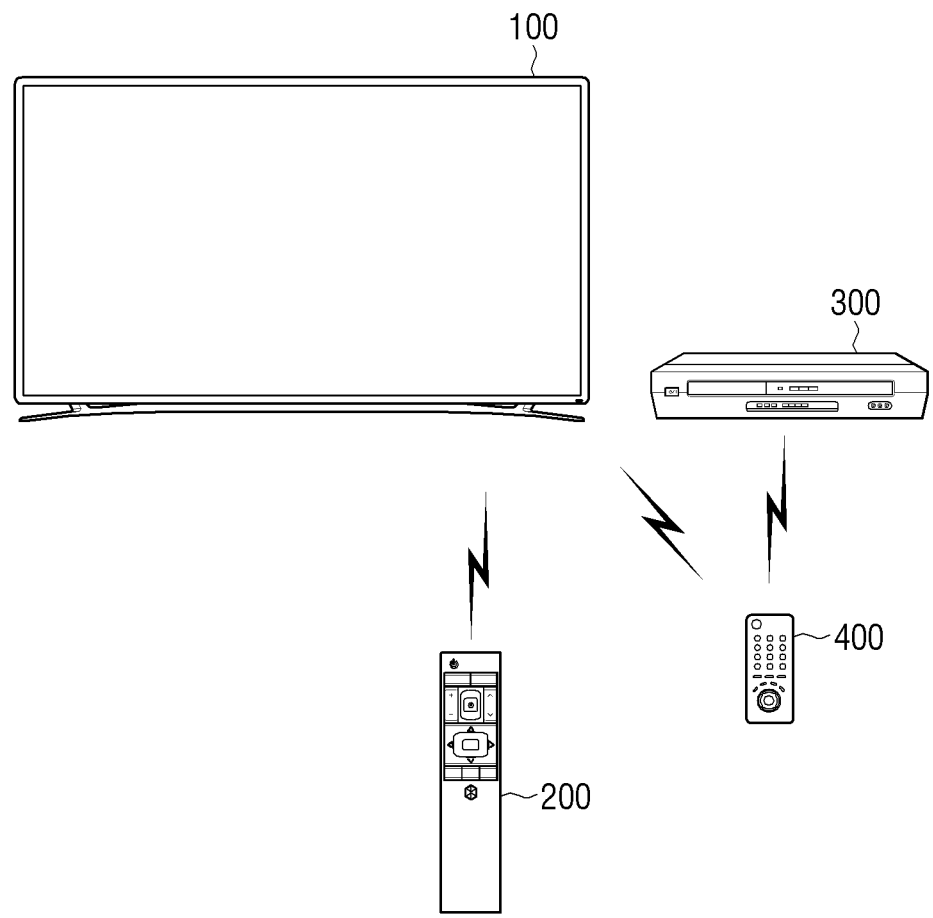
FIG. 2 is a diagram illustrating a configuration of a system for setting an integrated remote controller, according to an example embodiment.

FIG. 2 is a diagram illustrating a configuration of a system for setting an integrated remote controller, according to an example embodiment.

As illustrated in FIG. 2, an integrated remote controller setting system 1000 includes a display device 100, an integrated remote controller 200, an external device 300, and a remote controller 400 capable of controlling the external device.

The display device 100 is a device which is controlled by the integrated remote controller, and may be implemented as a digital TV. However, it may be any device capable of remote control, such as a PC and the like.

The integrated remote controller 200 is a device for remotely controlling the display device 100, and may receive a user command and transmit a signal corresponding to the received user command to the display device 100.

In particular, the integrated remote controller 200 may be operated as the remote controller 400 which is capable of controlling various external devices 300. Specifically, the integrated remote controller 200 may store a control code set of the remote controller 400 capable of controlling the external device 300, assign the control code set of the remote controller 400 to each remote control key of the integrated remote controller, and control the external device 300. Here, the control code set refers to a set of information relating to each remote control key of a remote controller and signal information (e.g., waveform) occurring when each remote control key is selected.

Meanwhile, the display device 100 may receive a remote control signal from the remote controller 400 to transmit a control code set corresponding to the remote controller 400 to an integrated remote controller.

When a remote control signal is transmitted from the remote controller 400 capable of controlling the external device 300 to the external device 300, the display device 100 receives the remote control signal from the remote controller 400 to automatically detect a control code set of the remote controller 400. Specifically, when the same code as a code of the remote control signal received from the remote controller 400 is detected from among a plurality of codes included in the control code set, the display device 100 may determine the control code set as a control code set of the remote controller 400. Subsequently, the display device 100 may transmit the control code set including the detected code to the integrated remote controller 200 to allow the control code set capable of controlling the external device 300 to be set in the integrated remote controller 200.

In addition, the display device 100 may display location information of the integrated remote controller while transmitting a control code set corresponding to the remote controller 400 to the integrated remote controller 200. Specifically, the display device 100 may receive location information of the integrated remote controller 200 from a sensor (e.g., GPS) included in the integrated remote controller 200, and provide the received location information to the display screen of the display device 100. In this case, the display device 100 may transmit a control command to provide feedback to the integrated remote controller 200 to allow the integrated remote controller 200 to provide at least one from among light feedback, haptic feedback and sound feedback. Here, the light feedback may be a feedback that turns on a light sensor of the integrated remote controller 200, and the haptic feedback may be an operation to vibrate the integrated remote controller 200, and the sound feedback may be an operation to control the integrated remote controller 200 to output a predetermined sound.

Accordingly, the user can easily identify a location of the integrated remote controller 200 and find the integrated remote controller 200 more easily by a feedback operation of the integrated remote controller 200.

Figure 3:
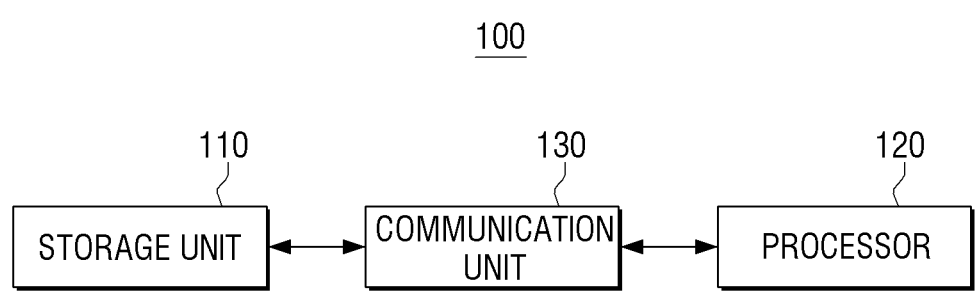
FIG. 3 is a block diagram illustrating a configuration of a display device, according to an example embodiment.

FIG. 3 is a block diagram illustrating a configuration of a display device, according to an example embodiment.

As illustrated in FIG. 3, the display device 100 includes a storage unit 110, a communication unit 120, and a processor 130.

The storage unit 110 stores a control code set corresponding to a plurality of remote controllers 400. Specifically, the remote controllers controlling the external device 300 may have different control code sets according to a manufacturer or a model, and the storage unit 110 may store a control code set corresponding to each of the remote controllers 400.

In addition, the storage unit 110 may store programs, such as a communication module 110 to provide setting of the integrated remote controller 200 according to an example embodiment, a signal processing module 112, a control code set detection module 113, a UI generation module 114, and the like. More detailed description of the communication module 111, the signal processing module 112, the control code set detection module 113 and the UI generation module 114 will be described below, with reference to FIG. 4B.

The communication unit 120 communicates with the integrated remote controller 200 or the remote controller 400 capable of controlling the external device 400. Specifically, the communication unit 120 transmits a remote control signal from the remote controller 400 capable of controlling the external device 400, and transmits a control code set detected by the processor 130 to the integrated remote controller 200. However, the example is not limited thereto, and the communication unit 120 may indirectly receive a remote control signal from the external device 400.

In addition, the communication unit 120 may receive location information of the integrated remote controller 200 from the integrated remote controller 200, and transmit a control command to provide feedback, to the integrated remote controller 200.

Here, the communication unit 120 may communicate with the integrated remote controller 200 through various communication methods, such as Bluetooth (BT), Bluetooth Low Energy (BLE), Wireless Fidelity (Wi-Fi), Zigbee, Infrared (IR), Serial Interface, Universal Serial Bus (USB), Near Field Communication (NFC), and the like. The NFC chip refers to a chip which operates in the NFC method using 13.56 MHz band from among various RF-ID frequency bands, such as 135 kHz, 13.56 MHz, 433 MHz, 860-960 MHz, 2.45 GHz, and the like. In a case in which a Wi-Fi chip or a Bluetooth chip is used, the communication unit 120 may first transmit or receive various connection information, such as SSID, session key, and the like, and communicatively connect using the various connection information to transmit or receive various information. The wireless communication chip refers to a chip which communicates according to various communication standard, such as IEEE, Zigbee, $3^{rd}$ Generation (3G), $3^{rd}$ Generation Partnership Project (3GPP), Long Term Evolution (LTE), and the like.

In addition, the communication unit 120 may be included in the display device 100 or may be included as a separate device. In a case in which the communication unit 120 is configured as a separate device, the communication unit 120 may transmit the received signal to the display device 100.

In particular, the communication unit 120 may, as a non-limiting example, receive any one of an IR signal, a BT signal, a BLE signal and a Zigbee signal, and receive signals of various frequency ranges.

The processor 130 controls the overall operations of the display device 100.

The processor 130 may detect a control code set corresponding to the remote controller 400 based on a remote control signal of the remote controller 400 capable of controlling the external device 300. Specifically, when a remote control signal of the remote controller 400 capable of controlling the external device 300 is received, the processor 130 may detect the same code as a code of the received remote control signal from among a plurality of control code sets pre-stored in the storage unit 110, and determine a control code set including the detected same code as a control code set corresponding to the remote controller 400.

However, if a plurality of control code sets include the same code as a code of the received remote control signal, the processor 130 may compare a code of a remote control different from the received remote control signal with a code included in the control code set to detect a control code set corresponding to the remote controller 400.

For example, when the user is to press a "channel up key" of the remote controller 400 to control the external device 300, a signal corresponding to "channel up key" is transmitted from the remote controller 400 to the external device 300. In this case, the communication unit 120 may receive a signal corresponding to the "channel up key" received from the remote controller 400. The processor 130 may compare a code corresponding to "channel up key" from among a plurality of control code sets stored in the storage unit 110 with a code of "channel up key" signal that has been received, and when the same code exists, determine a control code set including the same code as a control code set corresponding to the remote controller 400 and detect the determined control code set.

However, if a plurality of control code sets including the same code exist, the processor 130 may determine a control code set including the same code as a code of a signal of a key (e.g., volume up key) different from 'channel up key' from among the plurality of control code sets as a control code set corresponding to the remote controller 400, and this process may be repeated until only one control code set corresponding the remote controller 400 remains.

When a control code set corresponding to the remote controller 400 is detected, the processor 130 controls the detected control code set to be transmitted to the integrated remote controller 200. Specifically, the processor may detect a control code set including the same code as a code of the received remote control signal, and transmit the detected control code set to the integrated remote controller 200 so that a control code set capable of controlling the external device 300 is set in the integrated remote controller 200. Here, the control code set may be set by assigning the control code set to a remote controller key included in the integrated remote controller.

In addition, when a control code set corresponding to the remote controller 400 is detected and the detected control code set is transmitted to the integrated remote controller 200, the processor 130 may provide, to a display, a GUI indicating that controlling the external device 300 is available.

In this case, the processor 130 may determine a location of the integrated remote controller 200, and provide a UI indicating the location information of the integrated remote controller 200 to the display. Specifically, the processor 130 may determine a location of the integrated remote controller 200 based on the location information of the integrated remote controller 200 received from the integrated remote controller 200, and display the determined location on the corresponding location of a UI indicating the location information.

In addition, the processor 130 may transmit, to the integrated remote controller 200, a control command to control the integrated remote controller 200 to provide at least one from among light feedback, haptic feedback and sound feedback. That is, when a location of the is displayed on the display and the user tries to find the integrated remote controller 200, at least one from among light feedback, haptic feedback and sound feedback is provided from the integrated remote controller 200 so that the user may easily find the integrated remote controller 200.

In addition, when a plurality of remote control signals are received, the processor 130 may preferentially detect a remote control signal included in a control code set which is not set in the integrated remote controller 200, and transmit a control code set including the same code as a code of the detected remote control signal to the integrated remote controller 200.

In addition, when both the remote controller 400 capable of controlling the external device 300 and the integrated remote controller 200 simultaneously receive a signal, the processor 130 may process the signal according to a predetermined order. For example, the processor may first perform an operation according to a signal received by the integrated remote controller 200, detect a control code set based on a signal received by the remote controller 400 capable of controlling the external device 300, and transmit the detected control code set to the integrated remote controller 200.

As described above, according to the various example embodiments, a control code set corresponding to a remote controller of an external device may be transmitted to an integrated remote controller so that the integrated remote controller is automatically set, thus enhancing the user convenience and inducing the user to use the integrated remote controller.

Figure 4A:
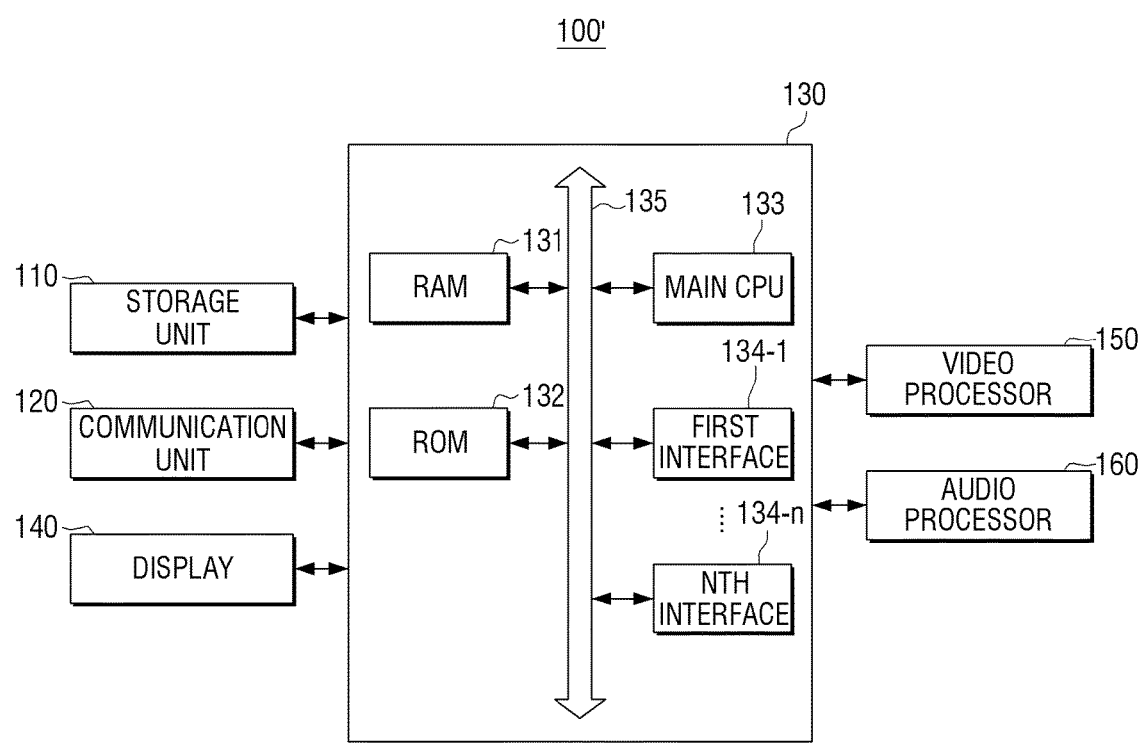
FIGS. 4A and 4B are block diagrams illustrating a detailed configuration of a display device, according to an example embodiment.
Figure 4B:
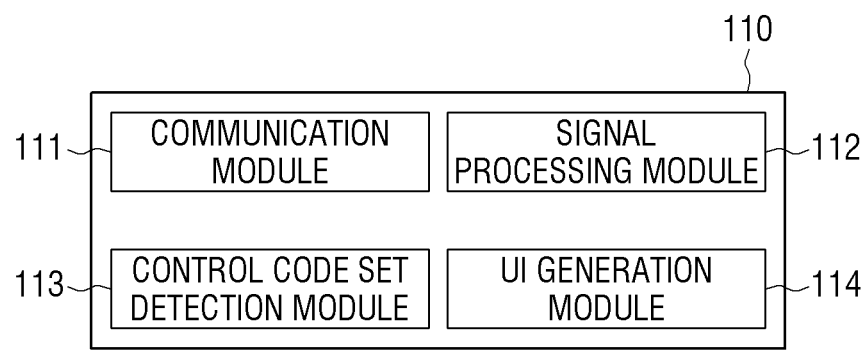

FIGS. 4A and 4B are block diagrams illustrating a detailed configuration of a display device, according to an example embodiment.

FIG. 4A is a block diagram illustrating a detailed configuration of the display device 100 illustrated in FIG. 3. Referring to FIG. 4A, a display device 100' includes a storage unit 110, a communication unit 120, a processor 130, a display 14, a video processor 150, and an audio processor 160. The detailed description of the elements described in FIG. 3 will be omitted herein.

The processor 130 controls the overall operations of the display device 100'.

Specifically, the processor 130 includes a RAM 131, a ROM 132, a main CPU 133, first to n-th interfaces 134-1 to 134-n, and a bus 135.

The RAM 131, the ROM 132, the main CPU 133, the first to n-th interfaces 134-1 to 134-n, etc. may be connected to each other via the bus 135.

The first to n-th interfaces 134-1 to 134-n are connected to various elements described above. One of the interfaces may be a network interface which is connected to an external device via network.

The main CPU access the storage unit 110 to perform booting by using an O/S stored in the storage unit 110. In addition, the main CPU 133 performs various operations by using various programs, contents, data, etc. stored in the storage unit 110.

The ROM 132 stores a set of instructions for booting a system, etc. When a turn-on command is received and power is supplied, the main CPU 133 copies the O/S stored in the storage unit 110 onto the RAM 131 according to the instruction stored in the ROM 132, and execute the O/S to boot the system. When booting is completed, the main CPU 133 copies various application programs stored in the storage unit 110 onto the RAM 131, and executes the applications programs copied onto the RAM 131 to perform various operations.

Meanwhile, the operation of the processor 130 mentioned above may be carried out by a program stored in the storage unit 110 as illustrated in FIG. 4B.

The storage unit 110 stores various data, such as an operating system (O/S) for driving the display device 100' and various multimedia contents.

In particular, the storage unit 110 may store programs, such as a communication module necessary for providing a method or setting an integrated remote controller according to an example embodiment, a signal processing module 112, a control code set detection module 113, and a UI generation module 114, as illustrated in FIG. 4B.

The processor 130 may receive a remote control signal from the remote controller 400 by using a communication module 141, and process the received remote control signal by using the signal processing module 142.

In addition, the processor 130 may detect a control code set corresponding to the remote controller 400 based on the remote control signal received from the remote controller 400 by using the control code set detection module 113.

For example, when a remote control signal is received from the remote controller 400, the processor 130 applies a signal processing algorithm to acquire a control code from the remote control signal. The processor 130 may compare the acquired control code by using a control code set detection algorithm with a plurality of control code sets stored in the storage unit 110 to detect a control code set including the same code.

In addition, the processor 130 may generate a GUI indicating that the external device 300 is controllable by the integrated remote controller 200 by using a UI generation module. Specifically, when the detected control code set is transmitted to the integrated remote controller 200, the processor 130 may generate a GUI indicating that the external device 300 is controllable by the integrated remote controller 200 and provide it to the display 140. Accordingly, the user may know that the external device 300 is made controllable by the integrated remote controller 200.

In addition, the processor 130 may generate a UI indicating location information of the integrated remote controller 200 by using a UI generation module. Specifically, the processor may determine a location of the integrated remote controller 200 to display a location of the integrated remote controller 200 on a corresponding location of a UI indicating location information of the integrated remote controller 200. Accordingly, the user may easily find the integrated remote controller 200 through a UI indicating location information of the integrated remote controller 200.

In addition, the display device 100' may further include a video processor 150 which processes video data, an audio processor 160 which processes audio data, a speaker which outputs not only various audio data processed in the audio processor 160 but also various alert sounds and voice messages, etc., a camera for photographing a still image or video under the control of a user, a microphone for receiving a user voice and other sounds and converting them to audio data, and etc.

Meanwhile, it is described in the above example embodiment that detection of a control code set according to a remote control signal of the remote controller 400 is performed in the display device 100'; however, the example is not limited thereto, and it may be performed through an algorithm stored in the external device 300.

Figure 5:
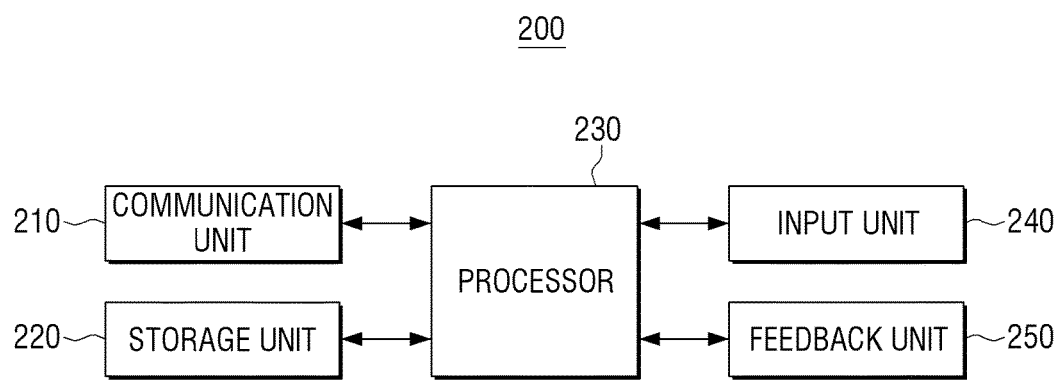
FIG. 5 is a block diagram illustrating a configuration of an integrated remote controller, according to an example embodiment.

FIG. 5 is a block diagram illustrating a configuration of an integrated remote controller, according to an example embodiment.

Referring to FIG. 5, an integrated remote controller 200 includes a communication unit 210, a storage unit 220, a processor 220, an input unit 240, and a feedback unit 250.

The communication unit 210 communicates with the display device 100 and the detailed description of a specific configuration of the communication unit 210 will be omitted herein, for it is similar to the communication unit 120 of the display device 100.

The storage unit 220 may store a control code set for controlling the display device 100 or the external device 300.

In addition, the storage unit 220 may store various data, such as an operating system (O/S) software for driving the integrated remote controller, an algorithm which detects a control module set based on a remote control signal, and the like.

When a control code set is received from the display device 100, the processor 230 may store the received control code set in the storage unit 220, and assign the stored control code set to a remote controller key included in the integrated remote controller 200. Specifically, the processor 230 may assign each code included in the stored control code set to assign each code to a remote controller key corresponding to each code, and when a user selects a particular remote controller key, transmit a control code assigned to the corresponding remote controller key to the external device 300.

In addition, when a control command for providing feedback is received from the display device 100, the processor 230 may control the feedback unit 250 to provide at least one from among light feedback, haptic feedback and sound feedback.

The input unit 240 may be implemented in a form including a button part, a touch pad, etc. For example, the input unit 240 may include a power button part which receives a user command for power on/off, a channel switch part for switching channels, a volume adjustment part for adjusting volume, and etc. In addition, each of the power button part, the channel switch part, the volume adjustment part, etc. may be configured as a remote controller key, and each remote controller key may be assigned the corresponding control code.

The feedback unit 250 may provide a predetermined feedback according to a control command of the display device 100. For example, the feedback unit 250 may include a light sensor, a vibration sensor, a speaker, etc. included in the integrated remote controller 200. Specifically, when a control command for providing light feedback is received from the display device 100, the feedback unit 250 may turn on a light included in the integrated remote controller 200, and when a control command for providing haptic feedback is received, turn on the vibration sensor to control the integrated remote controller 200 to vibrate. In addition, when a control command for providing sound feedback is received, the feedback unit 250 may output a predetermined sound through a speaker included in the integrated remote controller 200.

Figure 6:
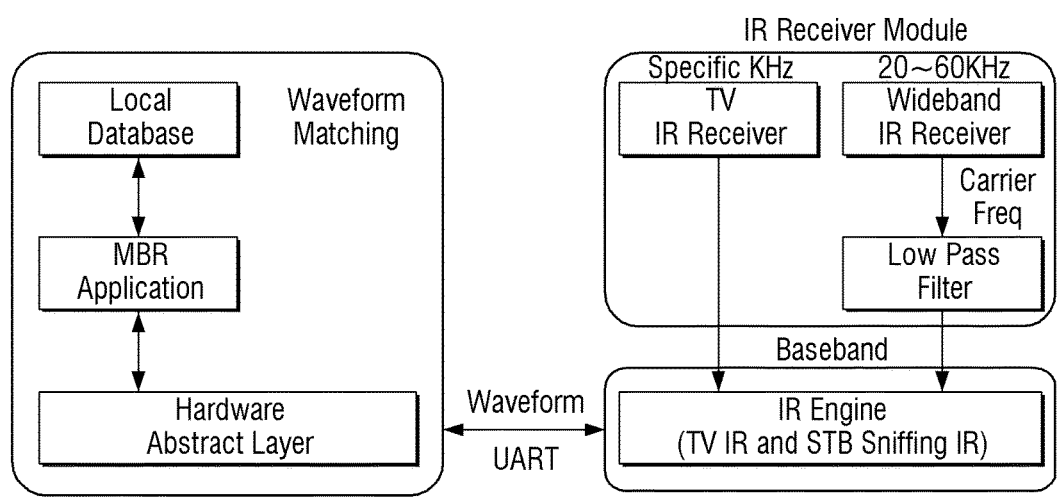
FIGS. 6 and 7 are diagrams illustrating a method for transmitting a control code set corresponding to a remote controller, according to an example embodiment.
Figure 7:
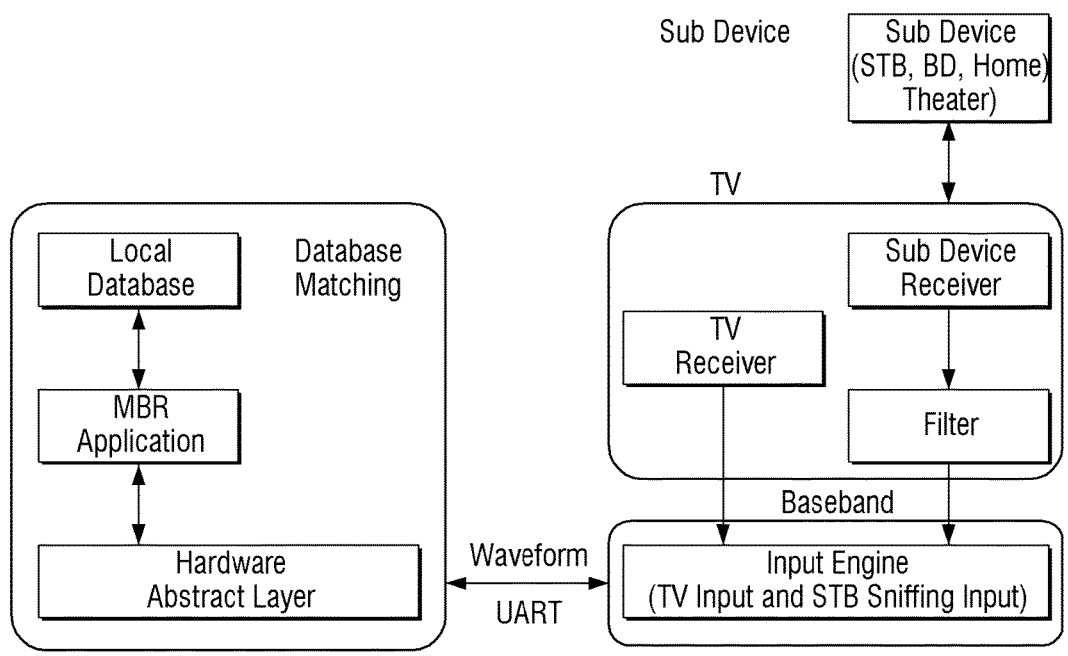

FIGS. 6 and 7 are diagrams illustrating a method for transmitting a control code set corresponding to a remote controller, according to an example embodiment.

FIG. 6 is a diagram illustrating a process in which the display device 100 receives a remote control signal from the remote controller 400 capable of controlling the external device 300, detects a control code set corresponding to the remote controller, and transmits the detected control code set.

Referring to FIG. 6, the display device 100 receives a remote control signal from the remote controller 400. In this case, the remote control signal is generally an IR signal, but various signals, such as a BT signal, a BLE signal, or the like, may be used.

The display device 100 may receive a remote control signal from the remote controller 400 by using a wideband receiver, compare a code of the remote control signal with a control code included in a plurality of control code sets stored in a local database, and detect a control code set corresponding to the remote controller 400. In this case, when the control code included in the plurality of pre-stored control code sets is identical to the code of the remote control signal, the display device 100 may determine that a control code set including the same control code is a control code set corresponding to the remote controller 400.

FIG. 7 is a diagram illustrating a process in which the display device 100 receives a remote control signal from the external device 300 to detect a control code set.

Referring to FIG. 7, the display device 100 may receive a remote control signal from the external device 300 (the sub device of FIG. 7), and in this case, the display device 100 may compare a code of the remote control signal received from the external device 300 with a code included in a plurality of pre-stored control codes to detect a control code set corresponding to the remote controller 400.

Figure 8:
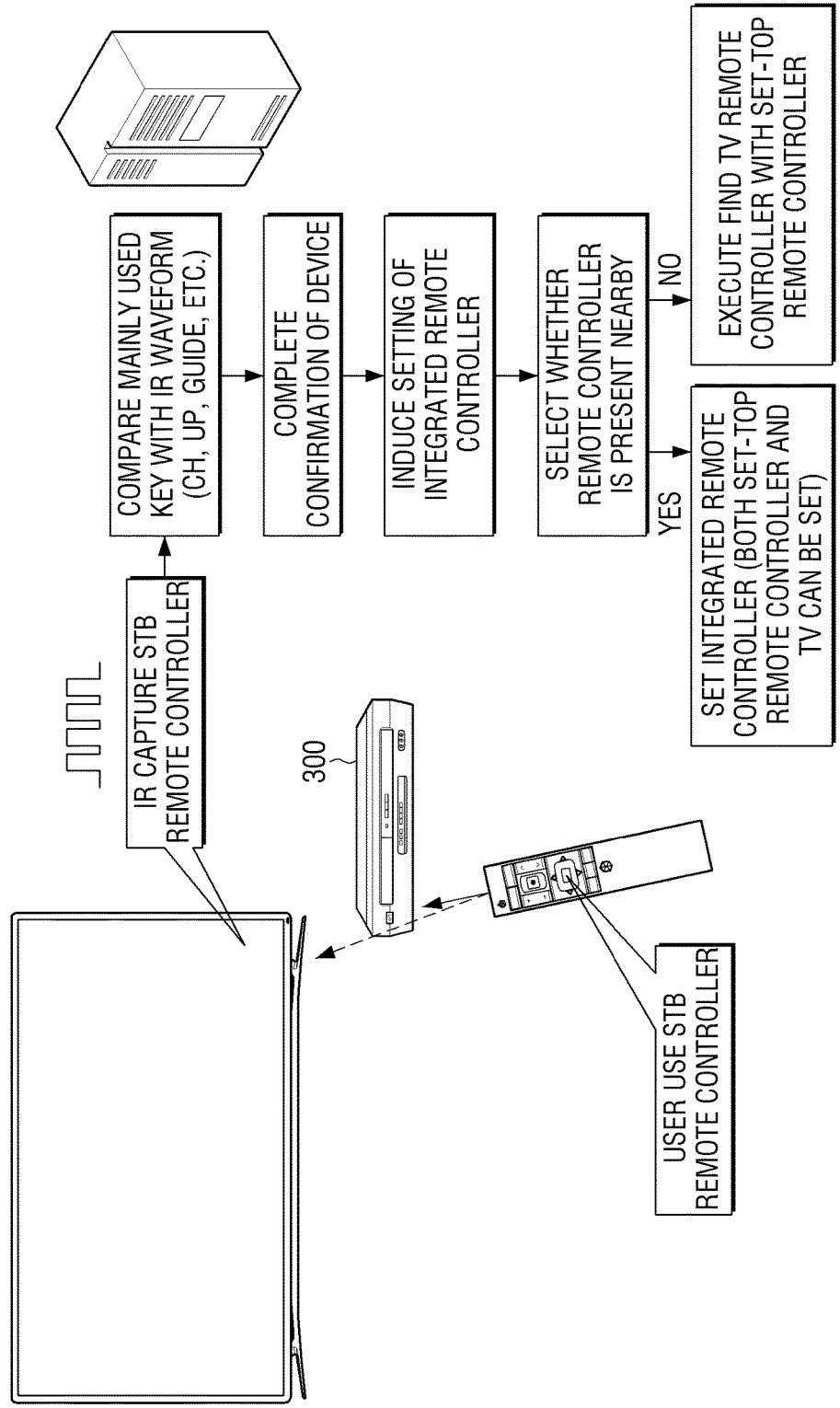
FIGS. 8 and 9 are flowcharts illustrating a process of detecting and transmitting a control code set of a STB remote controller in a case in which the user uses the STB remote controller.
Figure 9:
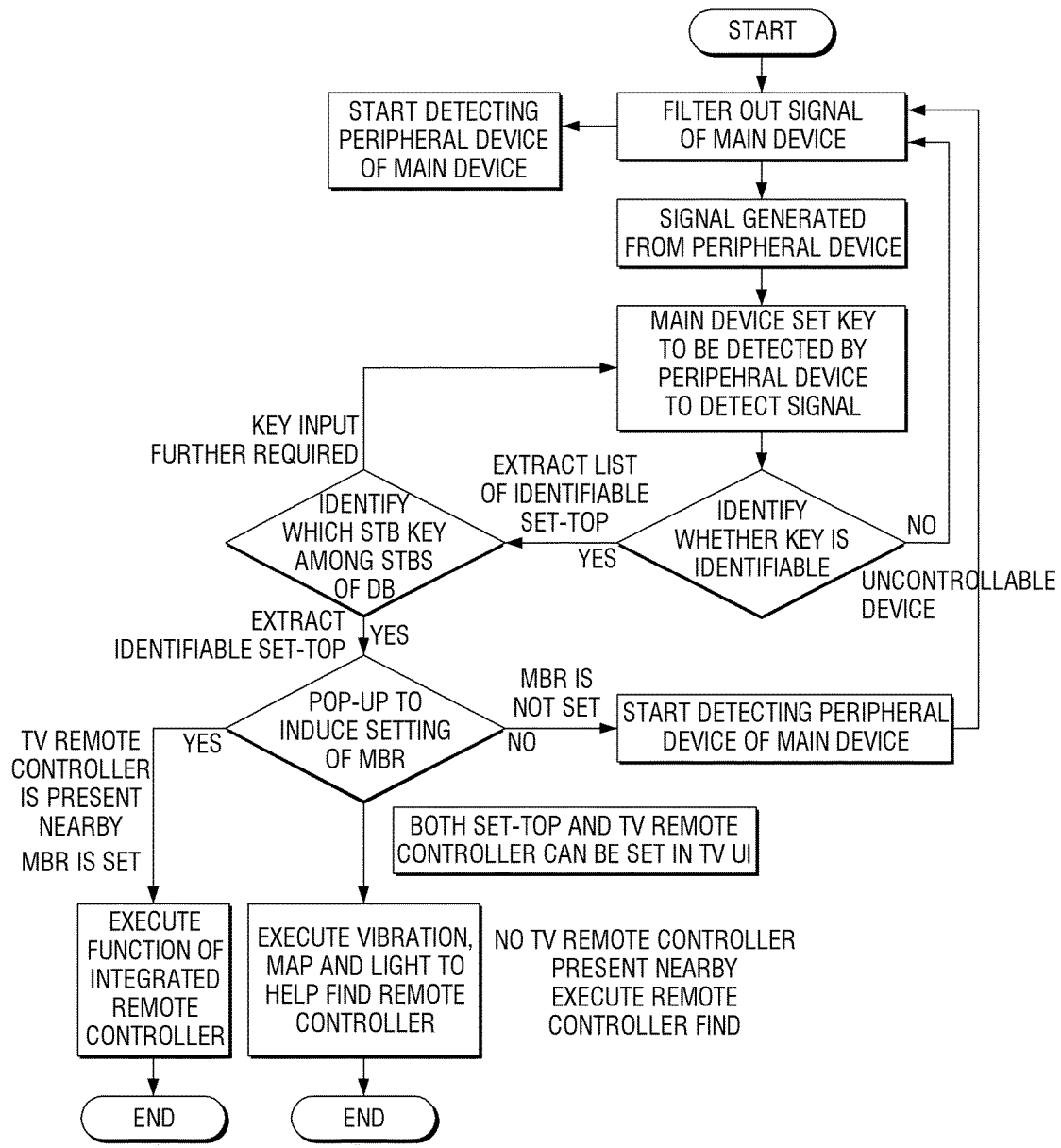

FIGS. 8 and 9 are flowcharts illustrating a process of, when the user uses a STB remote controller, detecting a control code set of the STB remote controller and transmitting the detected control code set, according to an example embodiment.

Referring to FIG. 8, when the user uses a STB remote controller, the display device 100 may receive a remote control signal from the STB remote controller, compare a code of the received remote control signal with a control code included in a plurality of pre-stored control code sets, and detect a control code set corresponding to the STB remote controller. The display device 100 may transmit the detected control code set to an integrated remote controller so that the STB may be controlled by the integrated remote controller. In this case, when the integrated remote controller is distanced from the display device by more than a predetermined distance, the display device 100 may provide a UI indicating location information of the integrated remote controller to a display.

Referring to FIG. 9, the display device 100 may receive a remote control signal received from the external device 300 from the external device 300. The display device 100 may compare a code of the remote control signal received from the external device 300 with a predetermined control code set to detect a control code set of the remote controller 400 capable of controlling the external device 300. Subsequently, when the integrated remote controller 200 is present within a predetermined distance, the display device 100 may transmit the detected control code set to the integrated remote controller 220, and when the integrated remote controller 200 is present outside the predetermined distance, display a UI indicating location information of the integrated remote controller or provide at least one from among light feedback, haptic feedback and sound feedback of the integrated remote controller.

FIG. 10 is a diagram illustrating a GUI indicating that an external device is controllable, provided on a display, according to an example embodiment.

Referring to FIG. 10, the processor 130 may generate a GUI indicating that the external device 300 is controllable by the integrated remote controller 200. Specifically, when the detected control code set is transmitted to the integrated remote controller 200, the processor 130 may generate a GUI indicating that the external device 300 is controllable by the integrated remote controller 200 and provide the GUI to the display 140. Accordingly, the user is informed that the external device 300 is made controllable by the integrated remote controller 200.

Figure 11:
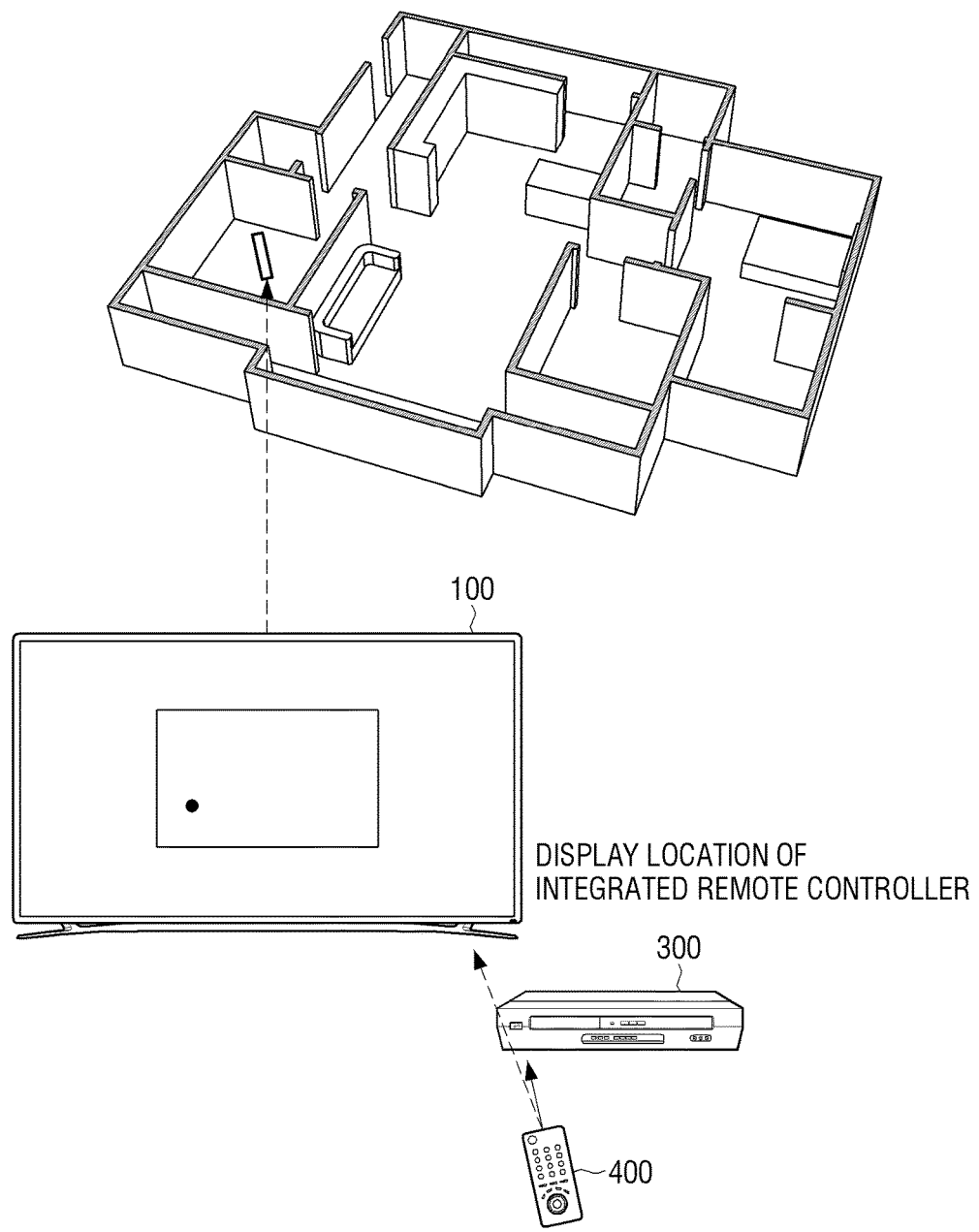
FIGS. 11-13 are diagrams illustrating various methods provided to help the user find an integrated speaker, according to the various example embodiments.
Figure 12:
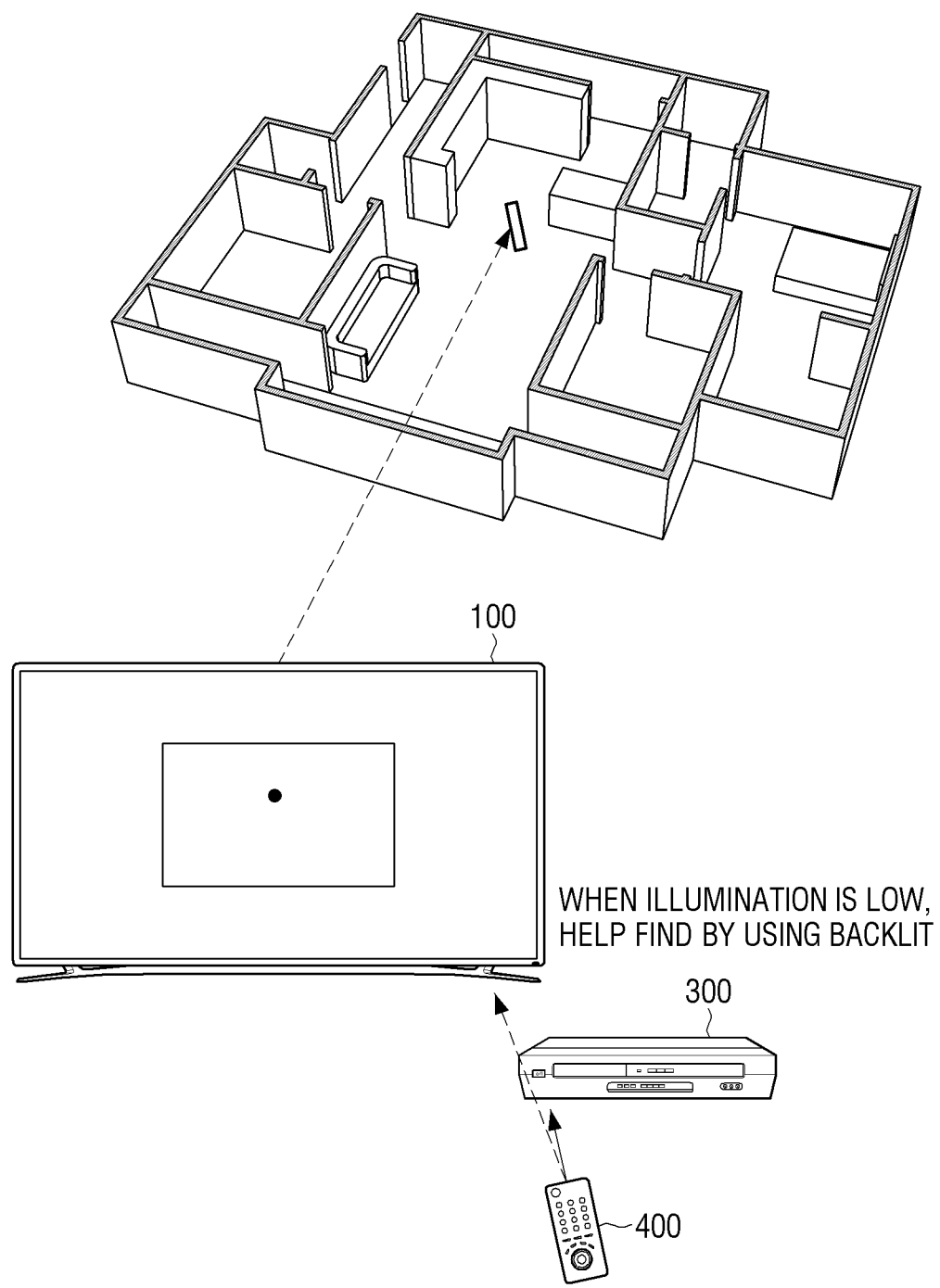
Figure 13:
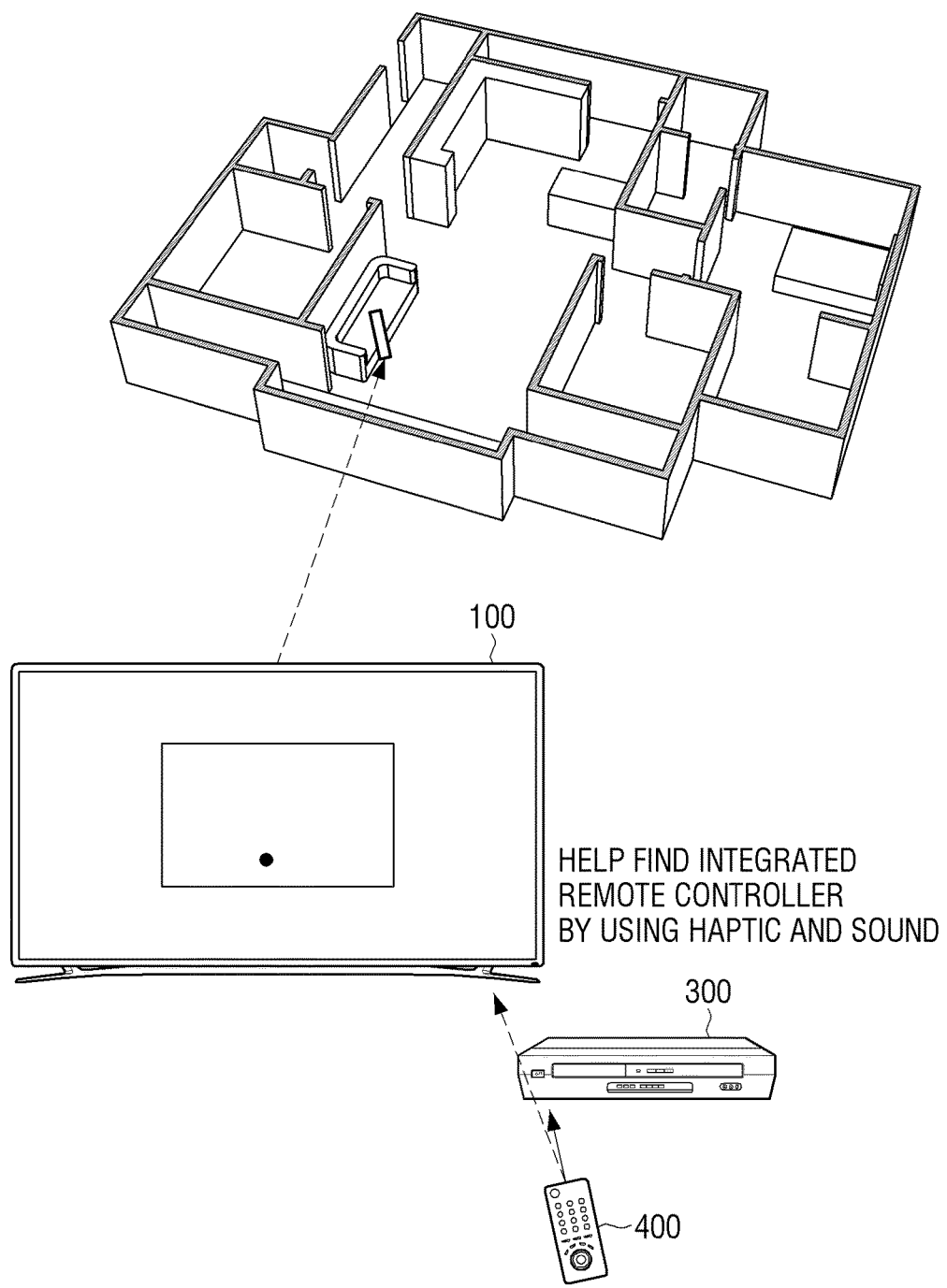

FIGS. 11-13 are diagrams illustrating various methods provided to help the user find an integrated remote controller, according to the various example embodiments.

Referring to FIGS. 11-13, the display device 100 may detect a control code set corresponding to the remote controller 400 capable of controlling the external device 300, when the detected control code set is to be transmitted to the integrated remote controller 200, display a UI indicating location information of the integrated remote controller 200 so that the user may easily find the integrated remote controller or control the integrated remote controller 200 to provide at least one from among light feedback, haptic feedback and sound feedback.

For example, when the integrated remote controller 200 is in a toilet, the display device 100 may display that the integrated remote controller 200 is present at a location corresponding to the toilet in a UI indicating the location information of the integrated remote controller 200. In addition, the display device 100 may receive illumination information of a peripheral area of the integrated remote controller 200, and when illumination of the peripheral area of the integrated remote controller 200 is low, provide light feedback, haptic feedback or sound feedback so that the user may easily find the integrated remote controller 200.

Figure 14:
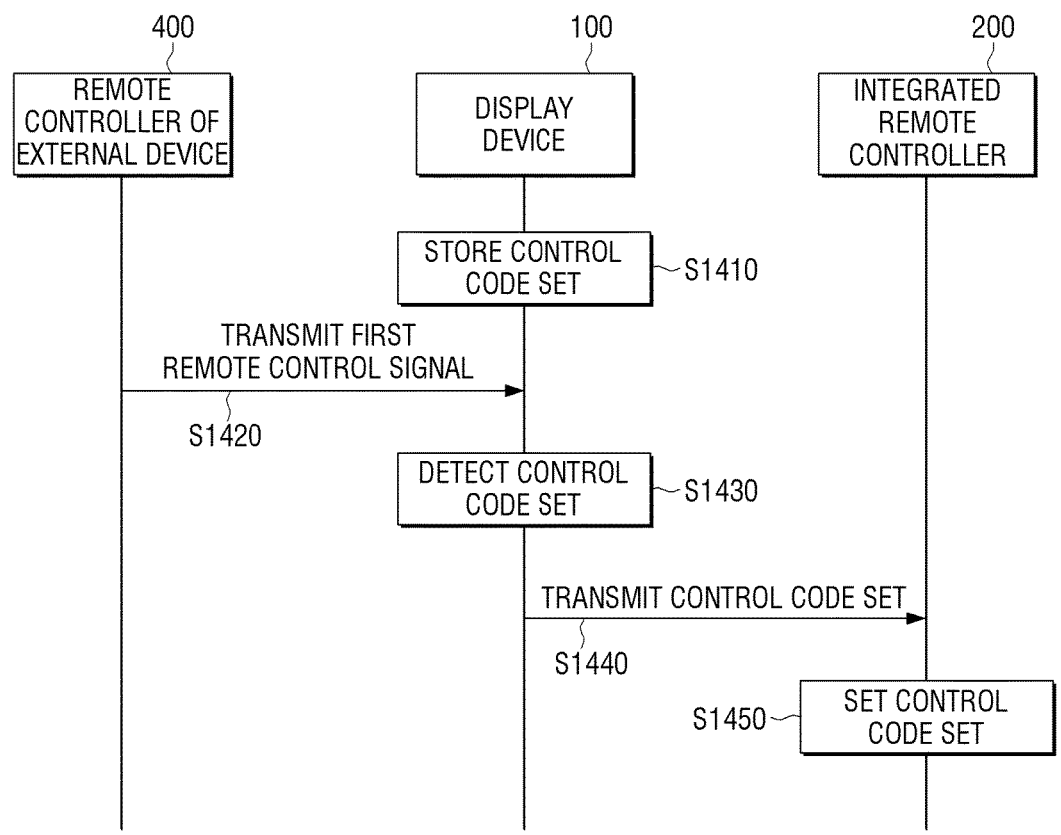
FIG. 14 is a sequence diagram of a system for setting an integrated remote controller, according to an example embodiment.

FIG. 14 is a sequence diagram of a system for setting an integrated remote controller, according to an example embodiment.

Referring to FIG. 14, the display device 100 stores a plurality of control code sets corresponding to each remote controller, at operation S1410. When a first remote control signal is transmitted from the remote controller 400 capable of controlling the external device 300 to the display device 100, the display device 100 detects a control code set corresponding to the remote controller 400 from among the plurality of control code sets. Specifically, when a code included in the plurality of pre-stored control code sets is the same as a code of the first remote control signal, the display device may determine that the corresponding code is a control code set of the first remote control signal.

The display device 100 transmits the detected control code set to the integrated remote controller 200, at operation S1440. When the control code set is received, the integrated remote controller 200 may store the control code set, assign the stored control code set to each of remote controller keys included in the integrated remote controller 200, and seta control code set, at operation S1450.

Figure 15:
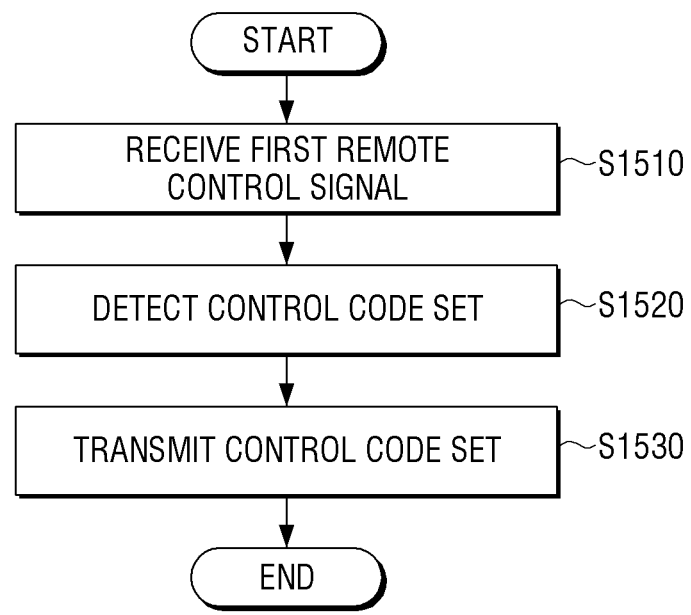
FIG. 15 is a flowchart illustrating a method for setting an integrated remote controller, according to an example embodiment.

FIG. 15 is a flowchart illustrating a method for setting an integrated remote controller, according to an example embodiment.

Referring to the method of setting an integrated remote controller of a display device illustrated in FIG. 15, first, a first remote control signal of a remote controller capable of controlling an external device is received at operation S1510. Here, the first remote control signal may be a signal which enables the remote controller to control the external device.

Then, a control code set is detected at operation S1520. Specifically, based on the received first remote control signal, a control code set corresponding to the remote controller from among control code sets corresponding to a plurality of pre-stored remote controllers may be detected.

Then, the control code is transmitted at operation S1530. Specifically, the detected control code set may be transmitted to an integrated remote controller so that a control set capable of controlling an external device may be set in the integrated remote controller.

Further, at operation S1520, when the same code as a code of the received first remote control signal from among a plurality of codes included in a control code set is detected, a control code set including the detected code may be detected as a control code set corresponding to the remote controller.

Further, at operation S1520, when a plurality of control code sets include the same code as a code of the received remote control signal, a control code set corresponding to the remote controller from among the stored control code sets may be detected based on a second remote control signal of the remote controller.

As described above, according to the various example embodiments of the present invention, a control code set corresponding to a remote controller of an external device may be transmitted to an integrated remote controller so that the integrated remote controller is automatically set, thus enhancing the user convenience and inducing the user to use the integrated remote controller.

Meanwhile, the methods according to the various example embodiments may be implemented merely by a software upgrade of a related-art display device.

Specifically, a non-transitory computer-readable medium where a program for performing the above-described setting method sequentially may be provided.

For example, there may be provided a non-transitory computer readable medium that stores a program that performs a step of receiving a first remote control signal of a remote controller capable of controlling an external device, detecting a control code set corresponding to the remote controller from among control code sets corresponding to a plurality of pre-stored remote controllers based on the received first remote control signal, and transmitting the detected control code set to an integrated remote controller.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A display device which is controllable by an integrated remote controller, comprising:
 a storage unit for storing control code sets corresponding to a plurality of remote controllers;
 a communication unit; and
 a processor configured to:
 receive, through the communication unit, a first remote controller signal for controlling an external device from a remote controller capable of controlling the external device,
 detect a control code set corresponding to the remote controller from among the stored control code sets, based on the received first remote controller signal, and
 control the communication unit to transmit the detected control code set to an integrated remote controller, the control code set indicating a set of information for setting remote control keys of the integrated remote controller.

2. The display device as claimed in claim 1, wherein the processor, in response to a same code as a code of the received first remote control signal being detected from among a plurality of codes included in the control code set, transmits a control code set including the detected code to the integrated remote controller and controls to set a control code set capable of controlling the external device in the integrated remote controller.

3. The display device as claimed in claim 2, wherein the processor, in response to a plurality of code sets including a same code as a code of the received first remote control signal, detects a control code set corresponding to the remote controller from among the stored control code sets based on a second remote control signal of the remote controller.

4. The display device as claimed in claim 1, further comprising: a display, wherein the processor, in response to the detected control code set being transmitted to the integrated remote controller, provides a graphic user interface (GUI) indicating that the external device is controllable by the integrated remote controller, through the display.

5. The display device as claimed in claim 4, wherein the processor determines a location of the integrated remote controller, and provide a user interface (UI) indicating location information of the integrated remote controller through the display.

6. The display device as claimed in claim 5, wherein the processor transmits a control command to control the integrated remote controller to provide at least one from among light feedback, haptic feedback and sound feedback.

7. The display device as claimed in claim 1, wherein the processor receives a control code set corresponding to each of the plurality of remote controllers from an external server and stores the received control code set in the storage unit.

8. The display device as claimed in claim 3, wherein the first and second remote control signals are any one of an infrared (IR) signal, a Bluetooth (BT) signal, a Bluetooth low energy (BLE) signal and a Zigbee signal.

9. A system which includes an integrated remote controller and a display device controllable by the integrated remote controller, wherein
 the display device is configured to, in response to a first remote control signal for controlling an external device from a remote controller capable of controlling the external device being received, detect a control code set corresponding to the remote controller from among control code sets corresponding to a plurality of remote controllers stored in the display device based on the received first remote control signal, and transmit the detected control code set to the integrated remote controller, and
 wherein the integrated remote controller is configured to store the control code set for controlling the external device received from the display device and to assign the stored control code set to remote controller keys of the integrated remote controller, the control code set indicating a set of information for setting the remote control keys of the integrated remote controller.

10. A method for setting an integrated remote controller of a display device, the method comprising:
 receiving a first remote control signal for controlling an external device from a remote controller capable of controlling the external device;
 detecting a control code set corresponding to the remote controller from among control code sets corresponding to a plurality of remote controllers stored in the display device based on the received first remote controller signal; and
 transmitting the detected control code set to the integrated remote controller, the control code set indicating a set of information for setting remote control keys of the integrated remote controller.

11. The setting method as claimed in claim 10, wherein the detecting comprises, in response to a same code as a code of the received first remote control signal being detected from among a plurality of codes included in the control code set, detecting a control code set including the detected code as a control code set corresponding to the remote controller, and wherein the transmitting comprises transmitting the detected control code set to the integrated remote controller and setting a control code set capable of controlling the external device in the integrated remote controller.

12. The setting method as claimed in claim 11, wherein the detecting comprises, in response to a plurality of control code sets including a same code as a code of the received first remote control signal, detecting a control code set corresponding to the remote controller from among the stored control code sets based on a second remote control signal of the remote controller.

13. The setting method as claimed in claim 10, further comprising: in response to the detected control code set being transmitted to the integrated remote controller, displaying a graphic user interface (GUI) indicating that the external device is controllable by the integrated remote controller.

14. The setting method as claimed in claim 13, further comprising: determining a location of the integrated remote controller and displaying a UI user interface (UI) indicating location information of the integrated remote controller.

15. The setting method as claimed in claim 14, further comprising: transmitting, to the integrated remote controller, a control command to control the integrated remote controller to provide at least one from among light feedback, haptic feedback and sound feedback.

\* \* \* \* \*